United States Patent
Heeren

(10) Patent No.: US 8,276,841 B2
(45) Date of Patent: Oct. 2, 2012

(54) HYDRAULIC ACTUATOR WITH END POSITION DAMPING

(75) Inventor: Jens Heeren, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 267 days.

(21) Appl. No.: 12/831,873

(22) Filed: Jul. 7, 2010

(65) Prior Publication Data

US 2011/0006156 A1    Jan. 13, 2011

Related U.S. Application Data

(60) Provisional application No. 61/223,490, filed on Jul. 7, 2009.

(30) Foreign Application Priority Data

Jul. 7, 2009 (DE) .......................... 10 2009 032 077

(51) Int. Cl.
    *B64C 5/10* (2006.01)

(52) U.S. Cl. ...................................... 244/99.3; 91/510

(58) Field of Classification Search ............... 244/99.3, 244/99.2, 99.6, 224, 225; 91/510; 60/477
    See application file for complete search history.

(56) References Cited

U.S. PATENT DOCUMENTS

| 4,272,117 | A | * | 6/1981 | Vilbeuf ...................... 296/65.02 |
| 4,296,677 | A | * | 10/1981 | Little et al. ...................... 91/510 |
| 5,109,672 | A | * | 5/1992 | Chenoweth et al. ............ 60/456 |
| 2003/0140781 | A1 | * | 7/2003 | Weiss ............................. 92/85 B |
| 2011/0006156 | A1 | * | 1/2011 | Heeren ......................... 244/99.5 |

FOREIGN PATENT DOCUMENTS

| DE | 196 37 291 C2 | 5/1997 |
| DE | 20 2005 018 038 U1 | 2/2006 |

OTHER PUBLICATIONS

German Office Action for Application 10 2009 032 077.6 dated Dec. 8, 2009.

* cited by examiner

*Primary Examiner* — Christopher P Ellis
*Assistant Examiner* — Medhat Badawi
(74) *Attorney, Agent, or Firm* — Ingrassia Fisher & Lorenz P.C.

(57) ABSTRACT

A hydraulic actuator includes, but is not limited to a first outflow and a second inflow and outflow as well as a closure device for closing the second inflow and outflow in the direction of outflow. The first outflow an outflowing hydraulic fluid is subjected to flow resistance. When a switching position is reached, the second inflow and outflow is closed in the direction of outflow so that the hydraulic fluid has to be discharged through the first outflow while overcoming the flow resistance. This damps the movement of the hydraulic actuator in the region of an end position.

14 Claims, 3 Drawing Sheets

HYDRAULIC ACTUATOR WITH END POSITION DAMPING

CROSS-REFERENCE TO RELATED APPLICATIONS

This application claims priority to German Patent Application No. 10 2009 032 077.6, filed Jul. 7, 2009 and also claims priority to U.S. Provisional Application No. 61/223,490 filed Jul. 7, 2009, both which are incorporated herein by reference in their entirety.

TECHNICAL FIELD

The invention relates to a hydraulic actuator, to the use of a hydraulic actuator and to an aircraft comprising at least one aperture, closable by means of a flap, wherein the flap is driven by a hydraulic actuator

BACKGROUND

For a long time, hydraulic actuators have been used in various systems and devices in which very considerable forces are required in very confined spaces. In modern commercial aircraft, too, hydraulic actuators are used at several positions, for example for moving control surfaces which due to the great dynamic pressure at high flight speeds are subjected to very considerable forces. When an aircraft is on the ground, cargo doors may be operated by hydraulic actuators in order to open or close a cargo space.

In larger commercial aircraft, which comprise a correspondingly large cargo space and thus large cargo doors, it may, at times, be observed that doors that are being opened tend to overshoot when the hydraulic actuator used reaches an end stop. This is due to the fact that the hydraulic actuator moves at full speed against the end stop, which in the state of the art occasionally is elastic, within certain limits, by means of a spring. However, since a larger cargo door is associated with relatively great inertia and since the lever travel of the hydraulic actuator used to open the cargo door is comparatively short, overshooting of the cargo door is induced when the end stop is reached, which overshooting represents a considerable load acting on the structure of the cargo door and of the cargo door frame, as well as on the bearing arrangement of both the cargo door and the hydraulic actuator.

In view of the foregoing, it may therefore be at least one object of the invention to reduce or entirely eliminate the above-mentioned disadvantage. In particular, it may be considered to be at least one object of the invention to propose a hydraulic actuator that is able to move larger objects from an initial position to an end position, and to prevent overshooting or subsequent oscillation when the end position has been reached. In addition, other objects, desirable features, and characteristics will become apparent from the subsequent summary and detailed description, and the appended claims, taken in conjunction with the accompanying drawings and this background.

SUMMARY

A hydraulic actuator according to an embodiment of the invention comprises a cylinder with a first inflow, a first outflow, and a second inflow and outflow for hydraulic fluid. In this context the term "inflow and outflow" refers to a connection of the hydraulic actuator, which connection may be used both as an inflow and as an outflow. In the following description, for improved differentiation between the first inflow and the first outflow, the above-mentioned inflow and outflow is designated the "second" inflow and outflow, optionally also the "second inflow" and "second outflow," where this appears sensible on the basis of the direction of flow of the hydraulic fluid.

By means of a closure device the second outflow may be closed off. The hydraulic actuator according to the invention furthermore comprises a resistance device for generating flow resistance; a piston that is movably held in the cylinder; and a piston rod that protrudes from the cylinder, which piston rod is connected to the piston. The resistance device is arranged on the first outflow and is designed to subject the hydraulic fluid flowing through the first outflow to flow resistance. The closure device is connected to the piston and is furthermore equipped, in a region between a switching position and an end position of the piston, to close the second outflow, and between an initial position and a switching position to open the second outflow again.

In accordance with the hydraulic actuator of the invention, it may consist of the outflow of hydraulic fluid being provided by two outflows that are separated from each other and that are arranged in parallel, wherein the second outflow allows unhindered flow of the hydraulic fluid to the outside, while the first outflow as a result of the resistance device subjects the hydraulic fluid to flow resistance. Consequently, flowing-out from the first outflow is made more difficult when compared to flowing-out from the second outflow. As soon as the piston moves to the end position and consequently reaches the switching position, the second outflow is closed so that only the first outflow is available for discharging the hydraulic fluid. As a result of this the movement of the piston and of the objects moved by the hydraulic actuator is slowed or damped.

By means of selecting a corresponding switching position the movement of the hydraulic actuator may be predetermined in such a manner that a particular region of the path to be traveled is to be arranged in the same manner as with a conventional hydraulic actuator, but for the remaining distance damping occurs in order to avoid oscillations or non-cushioned shocks to the object moved by the hydraulic actuator.

It is clear to the average person skilled in the art that this process is reversible so that during each extension process to the end position from the switching position damping occurs, while in a region upstream of this the movement occurs without damping.

According to an advantageous embodiment of the hydraulic actuator according to the invention, the resistance device may be designed as a diaphragm with a predetermined flow resistance. The diaphragm could, for example, be an aperture diaphragm that considerably reduces the cross section through which the hydraulic fluid flows out, thus causing considerable flow resistance. An aperture diaphragm or a diaphragm formed in some other way is very light in weight and is economical to produce.

In a further advantageous embodiment of the hydraulic actuator according to the invention, the resistance device is designed as a throttle with an infinitely adjustable flow resistance. This facilitates, in particular, calibration in order to optimise damping that is adequate for a particular application, because the throttle may be adjusted with simple means.

In an advantageous embodiment of the hydraulic actuator according to the invention, the closure device is implemented by combining a second inflow- and outflow entrance aperture with a cross-sectional profile of the piston rod, wherein the second inflow- and outflow entrance aperture corresponds to the second inflow and outflow, is arranged in the cylinder between the piston and a guide device of the piston rod, and comprises an aperture cross section for taking up outflowing hydraulic fluid or for discharging inflowing hydraulic fluid. The piston rod comprises a first section, which faces away from the piston, with a constant cross section that is smaller than the aperture cross section. The piston rod, furthermore, comprises a second section, which faces the piston, with a cross section that is approximately similar to the aperture cross section and comprises a shape that corresponds to that of the aperture. The second inflow- and outflow entrance aperture and thus the second outflow closes when the second section enters the inflow- and outflow entrance aperture, wherein the position of the switching position is predetermined by the largest cross section of the second section.

This illustrates that in the cylinder an inflow- and outflow entrance aperture is present through which the hydraulic fluid reaches the second outflow when the piston approaches its end position. In the region of the end position a guide device is arranged, through which the piston rod is guided in a linear manner coaxially to the cylinder and extends towards the outside to the object to be moved. In this arrangement the piston rod extends through the aperture cross section of the second inflow- and outflow entrance aperture. The second inflow- and outflow entrance aperture and the first section of the piston rod are dimensioned in such a way that sufficient space remains between the edges of the second inflow- and outflow entrance aperture and the first section of the piston rod for the hydraulic fluid to be discharged to be able to pass through. This essentially permits unhindered movement of the piston in the direction of the end position. However, if the second section of the piston rod approaches the second inflow- and outflow entrance aperture, then the latter is closed. This happens because the largest cross section of the second section of the piston rod is similar to the aperture cross section of the second inflow- and outflow entrance aperture. Consequently, no space exists between the piston rod and the edges of the second inflow- and outflow entrance aperture, through which space hydraulic fluid could discharge. Consequently, all the hydraulic fluid to be discharged may be discharged exclusively through the first outflow, which is, however, coupled to the resistance device, which slows down or dampens the movement of the piston. Accordingly, movement of the piston is automatically damped when the switching position is reached, which is the position of the largest cross section of the second section of the piston rod.

In this context it is immaterial as to the manner in which the changes in the cross section are brought about, so that a multitude of possible changes in the cross section may lead to success. In view of the loads that occur in the movement of relatively heavy objects, a preferred improvement of the hydraulic actuator according to the invention for better insertion of the second section into the second inflow- and outflow entrance aperture comprises a gradual transition between the first section of the piston rod and the largest cross-sectional area of the second section. This could, for example, be a linear rise from a first diameter in the first section to a second diameter in the second section. By means of a gradual approach of the cross sections, the attenuation effect is gradual, which could be advantageous in certain applications.

In an equally advantageous embodiment of the hydraulic actuator according to the invention the piston rod furthermore comprises a third section that is arranged between the second section of the piston rod and the piston. This third section could comprise a constant cross section that is similar to the cross section of the outflow entrance aperture. This third section defines the distance along which a complete damping effect is carried out. By means of a corresponding design of the piston rod, while the hydraulic actuator is otherwise unchanged, for each application the positions and dimensions of the second and of the third section may be adjusted individually to the respective application.

Finally, a further advantageous embodiment of the hydraulic actuator according to the invention comprises a first inflow for feeding hydraulic fluid into the region between the second inflow- and outflow entrance aperture and the piston, a first nonreturn valve for preventing the outflow of hydraulic fluid through the first inflow, and a second nonreturn valve for closing the first outflow when hydraulic fluid is fed in through the first or the second inflow. In this way irregularities in the operation of the hydraulic actuator according to the invention may be precluded so that its reliability increases and the damping effect is not negatively affected.

Furthermore, the at least one object is met by the use of a hydraulic actuator with the characteristics described above for moving an object on a vehicle. Finally, the at least one object of the invention is also met by an aircraft comprising at least one aperture that is closed by a flap or a door, and by a hydraulic actuator with the characteristics as described above, which actuator moves this flap or door.

BRIEF DESCRIPTION OF THE DRAWINGS

Further characteristics, advantages and potential applications of the present invention are disclosed in the following description of the exemplary embodiments and of the figures. All the described and/or illustrated characteristics per se and in any combination form the subject of the invention, even irrespective of their composition in the individual claims or their interrelationships. Furthermore, identical or similar components in the figures have the same reference characters.

DETAILED DESCRIPTION

The following detailed description of the invention is merely exemplary in nature and is not intended to limit the invention or the application and uses. Furthermore, there is no intention to be bound by any theory presented in the preceding background or summary the following detailed description.

Figure 1:
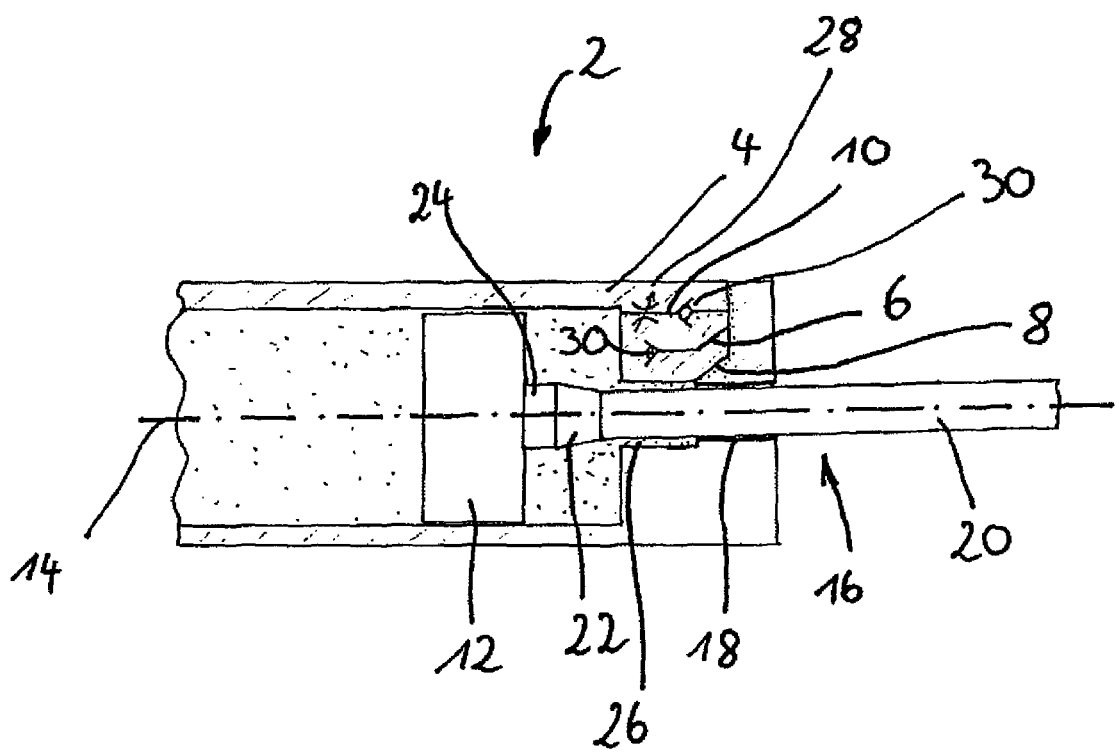
FIG. 1 shows the hydraulic actuator according to an embodiment of the invention during an extension movement.

FIG. 1 shows a hydraulic actuator 2 according to an embodiment of the invention, which hydraulic actuator 2 comprises a cylinder 4 with a first inflow 6, a second inflow and second outflow 8, and a first outflow 10. In the cylinder 4 a piston 12 is movably arranged, which piston 12 may be moved along the longitudinal axis 14. The piston 12 is arranged on a piston rod 16 that is guided by means of a guide device 18.

The piston rod 16 comprises a first section 20, a second section 22 and a third section 24. The first section 20 comprises the smallest cross section, while the third section 24 comprises the largest cross section. In the second section 22 a gradual increase in the cross section from the first section 20 to the third section 24 is achieved.

The cylinder 4 comprises a second inflow- and outflow entrance aperture 26 that corresponds to the second inflow and second outflow 8. In this way when the piston 12 is moved to the right in the drawing plane, discharge of hydraulic fluid towards the second inflow- and outflow entrance aperture 26 from the cylinder 4 to a discharge line is made possible. The aperture cross section that is usable for the hydraulic fluid to flow out is defined by the cross section differential between the second inflow- and outflow entrance aperture 26 and the cross section of the first section 20 of the piston rod 16.

In the case shown, only the first section 20 of the piston rod 16 is in the region of the second inflow- and outflow entrance aperture 26, so that a relatively large cross-sectional area may be used for the hydraulic fluid to flow out.

The first outflow 10 comprises a resistance device 28, designed as a throttle, which resistance device 28 subjects outflowing hydraulic fluid to flow resistance. Downstream in the first outflow 10 there is a nonreturn valve 30 that prevents hydraulic fluid from flowing into the cylinder 4 by way of the first outflow 10.

Since the aperture cross section between the second inflow- and outflow entrance aperture 26 and the first section 20 of the piston rod 16 is the largest, all the hydraulic fluid flows in this way into the second outflow 8; the hydraulic fluid does not flow, or only flows to a very small extent, through the first outflow 10.

When the piston 12 is moved to the right in the drawing plane, the first inflow 6 is closed by means of a nonreturn valve 30. This prevents the hydraulic fluid from flowing out by way of the first inflow 6.

It should be pointed out that the end position of the hydraulic actuator 2 or of the piston 12 is in the extreme right region, in the drawing plane, of the cylinder 4, which region the piston 12 may reach.

Figure 2:
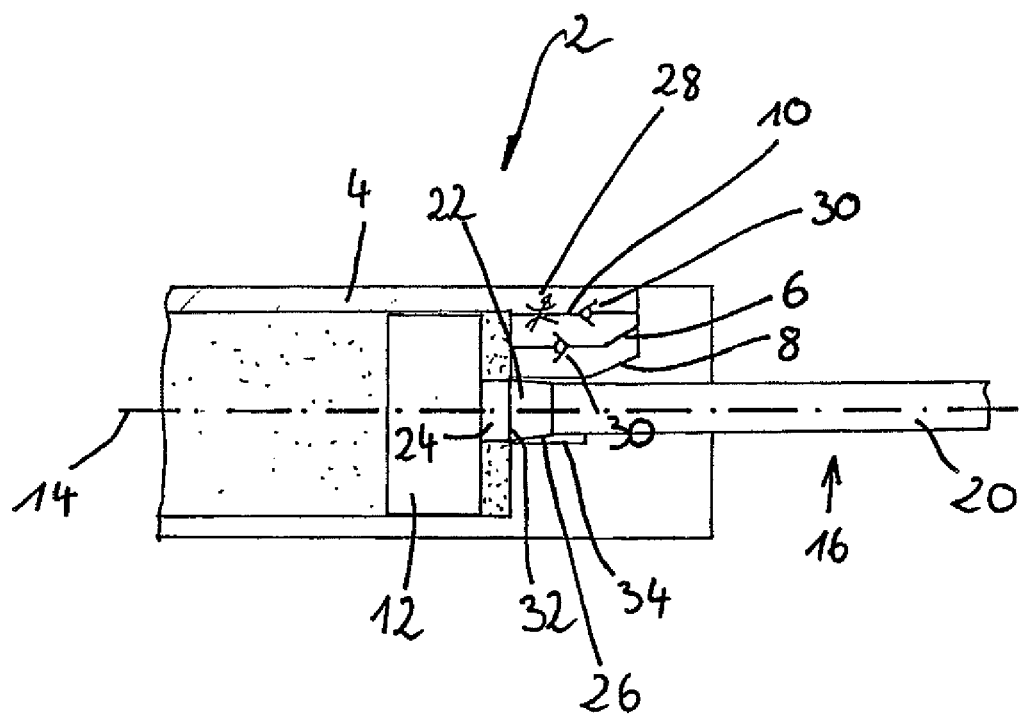
FIG. 2 shows a hydraulic actuator according to an embodiment of the invention during an extension movement at the time damping commences.

FIG. 2 shows the hydraulic actuator 2 in a state moved further towards the end position. In this illustration the second section 22 of the piston rod 16 is almost completely enclosed by the second inflow- and outflow entrance aperture 26 so that the larger cross section 32 touches the edges 34 of the second inflow- and outflow entrance aperture 26, so that the second inflow- and outflow entrance aperture 26 is closed. Accordingly it is no longer possible to discharge hydraulic fluid by way of the second outflow 8 from the cylinder 4. Instead, the hydraulic fluid is now forced to move by way of the resistance device 28 through the first outflow 10, which is made more difficult as a result of the flow resistance determined by the resistance device 28. As a result of this, greater force is required to move the piston 12 at the same speed, or conversely, with a constant external force the movement of the piston 12 is decelerated and thus damped.

In this way very reliable damping of the end position of the piston 12 is ensured in a manner that is very simple from a design perspective. By dimensioning the individual sections 20 to 24 the switching position that corresponds to the position of the largest cross section 32 of the second section 22 may be selected, and at the same time by dimensioning the length of the third section 24 of the piston rod 16 the route by way of which damping is to take place may be determined.

The state of damping is reversible in a very simple manner. As soon as the piston 12 is deflected again towards the left in the drawing plane, the first inflow 6 is activated again, and in this way non-damped movement of the piston 12 up to the switching position is ensured.

Figure 3:
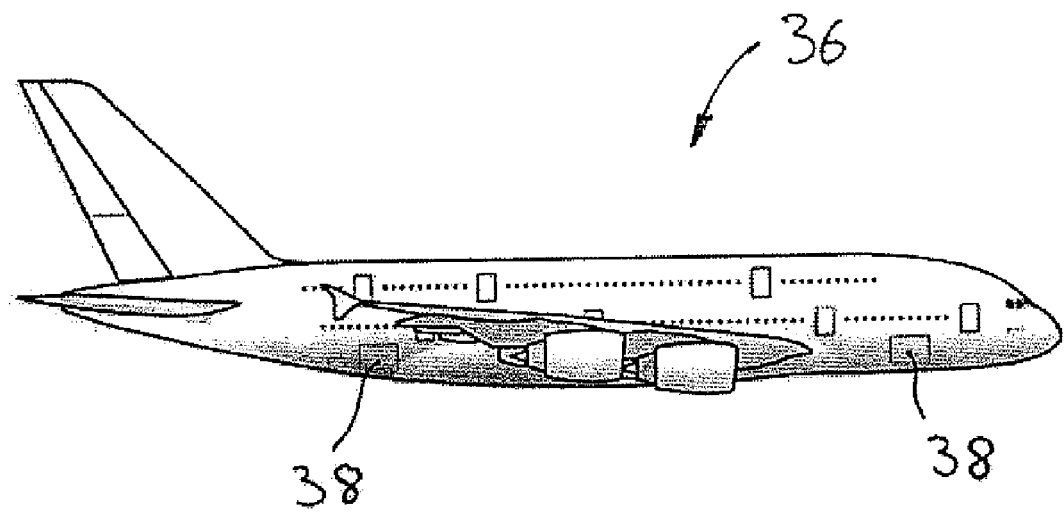
FIG. 3 shows an aircraft comprising at least one aperture that may be closed by a flap, wherein the flap is moved by a hydraulic actuator according to the invention.

An aircraft 36 shown in FIG. 3 comprises several apertures which may be closed by flaps 38, and the term flaps 38 also covers cargo doors, hatches or the like. These flaps 38 are in each case driven by means of at least one hydraulic actuator 2, so that during opening of the flaps 38 when their end position is reached any abrupt stopping of the movement and thus subsequent oscillation is prevented. This gentle effect is beneficial to the structure of the aircraft 36 around the flaps 38 as well as on the bearing arrangement of the flaps 38 and of the hydraulic actuators 2.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations. Moreover, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope set forth in the appended claims and their legal equivalents.

What is claimed is:

1. A hydraulic actuator, comprising:
   a cylinder with a first inflow, a first outflow, a second inflow, and a second outflow for a hydraulic fluid;
   a closure device for closing the second inflow and second outflow in a direction of an outflow;
   a resistance device for generating flow resistance;
   a piston that is movably held in the cylinder;
   a piston rod connected to the piston and protruding from the cylinder;
   a first non-return valve connected to the first inflow for preventing the outflow of the hydraulic fluid through the first inflow; and
   a second non-return valve connected to the first outflow and connected in series with the resistance device for closing the first outflow when the hydraulic fluid is fed in through the first inflow;
   wherein the resistance device is designed to subject the hydraulic fluid flowing through the first outflow to flow resistance, and
   wherein the closure device is connected to the piston and is equipped, in a region between a switching position and an end position of the piston, to close the second inflow and outflow in the direction of outflow, and to open it between an initial position and a switching position.

2. The hydraulic actuator of claim 1, wherein the resistance device is a diaphragm with a predetermined flow resistance.

3. The hydraulic actuator of claim 1, wherein the resistance device is a throttle with an infinitely adjustable flow resistance.

4. The hydraulic actuator of claim 1,
   wherein the closure device is implemented by combining a second inflow aperture and an outflow entrance aperture with a cross-sectional profile of the piston rod,
   wherein the second inflow and the outflow entrance aperture corresponds to the second inflow and outflow, is arranged in the cylinder between the piston and a guide device of the piston rod, and comprises an aperture cross section for taking up outflowing of the hydraulic fluid,
   wherein the piston rod comprises a first section, which faces away from the piston, with a constant cross section that is smaller than the aperture cross section, and comprises a second section, which faces the piston, with a cross section that is approximately similar to the aperture cross section and comprises a shape that corresponds to that of the aperture so that the second inflow and the outflow entrance aperture and thus the second inflow and outflow closes in the direction of outflow when the second section enters the second inflow and outflow entrance aperture, wherein a position of the switching position is predetermined by a largest cross section of the second section.

5. The hydraulic actuator of claim 4, wherein the cross section of the first section of the piston rod gradually approximates the cross section of the second section of the piston rod so that a damping effect occurs gradually.

6. The hydraulic actuator of claim 4, wherein the piston rod furthermore comprises a third section that is arranged between the second section of the piston rod and the piston and that comprises a constant cross section that is similar to the cross section of the second inflow and outflow entrance aperture.

7. The hydraulic actuator of claim 1, wherein the hydraulic actuator is adapted to move an object on a vehicle.

8. An aircraft, comprising:
at least one space;
a flap adapted to close the at least one space;
a hydraulic actuator that moves said flap;
a cylinder with a first inflow, a first outflow, a second inflow, and a second outflow for a hydraulic fluid;
a closure device for closing the second inflow and outflow in a direction of outflow;
a resistance device for generating flow resistance;
a piston that is movably held in the cylinder;
a piston rod that protrudes from the cylinder and the piston rod is connected to the piston;
a first non-return valve connected to the first inflow for preventing the outflow of the hydraulic fluid through the first inflow; and
a second non-return valve connected to the first outflow and connected in series with the resistance device for closing the first outflow when the hydraulic fluid is fed in through the first inflow;
wherein the resistance device is designed to subject the hydraulic fluid flowing through the first outflow to flow resistance, and
wherein the closure device is connected to the piston and is equipped, in a region between a switching position and an end position of the piston, to close the second inflow and outflow in the direction of outflow, and to open it between an initial position and a switching position.

9. The aircraft of claim 8, wherein the resistance device is a diaphragm with a predetermined flow resistance.

10. The aircraft of claim 8, wherein the resistance device is a throttle with an infinitely adjustable flow resistance.

11. The aircraft of claim 8,
wherein the closure device is implemented by combining a second inflow aperture and outflow entrance aperture with a cross-sectional profile of the piston rod,
wherein the second inflow and outflow entrance aperture corresponds to the second inflow and outflow, is arranged in the cylinder between the piston and a guide device of the piston rod, and comprises an aperture cross section for taking up outflowing of the hydraulic fluid,
wherein the piston rod comprises a first section, which faces away from the piston, with a constant cross section that is smaller than the aperture cross section, and comprises a second section, which faces the piston, with a cross section that is approximately similar to the aperture cross section and comprises a shape that corresponds to that of the aperture so that the second inflow- and outflow entrance aperture and thus the second inflow and outflow closes in the direction of outflow when the second section enters the second inflow- and outflow entrance aperture, wherein a position of the switching position is predetermined by a largest cross section of the second section.

12. The aircraft of claim 11, wherein the cross section of the first section of the piston rod gradually approximates the cross section of the second section of the piston rod so that a damping effect occurs gradually.

13. The aircraft of claim 11, wherein the piston rod furthermore comprises a third section that is arranged between the second section of the piston rod and the piston and that comprises a constant cross section that is similar to the cross section of the second inflow and outflow entrance aperture.

14. The aircraft of claim 8, wherein the hydraulic actuator is adapted to move an object on a vehicle.

* * * * *